No. 771,186. PATENTED SEPT. 27, 1904.
W. S. SUTTON.
BORING APPARATUS.
APPLICATION FILED DEC. 26, 1902.
NO MODEL.

WITNESSES:
Chas. H. Ebert
Oscar Steuernagel.

INVENTOR,
William S. Sutton,
By Paul Synnestvedt
Att'y.

No. 771,186. Patented September 27, 1904.

UNITED STATES PATENT OFFICE.

WILLIAM S. SUTTON, OF ROCKFORD, ILLINOIS, ASSIGNOR TO AMERICA COMPANY, OF ROCKFORD, ILLINOIS, A CORPORATION OF ILLINOIS.

BORING APPARATUS.

SPECIFICATION forming part of Letters Patent No. 771,186, dated September 27, 1904.

Application filed December 26, 1902. Serial No. 136,624. (No model.)

*To all whom it may concern:*

Be it known that I, WILLIAM S. SUTTON, a citizen of the United States, residing at Rockford, in the State of Illinois, have invented certain new and useful Improvements in Boring Apparatus, of which the following is a specification.

My invention relates particularly to means for boring small holes in such material as wood; and its objects are, to insure accurate progress of the boring tool through the wood or other material in a true line, to obviate the necessity of guides or supports for a long drill in boring, to provide for the ready removal of the chips from the boring, and particularly to provide means for boring very small holes of great depth. The invention is also designed to supply an improved construction and arrangement of the apparatus by which its operation is simple and the cost much reduced.

The above objects, as well as other advantages which will hereinafter appear, I attain by the means and method of procedure illustrated in preferred form in the accompanying drawings.

Figure 1:
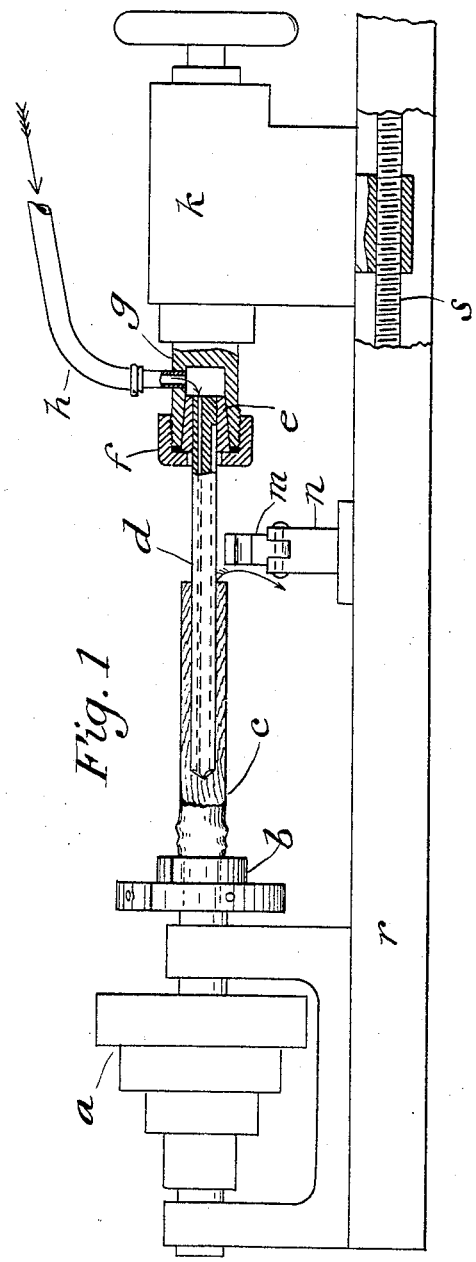
Figure 2:
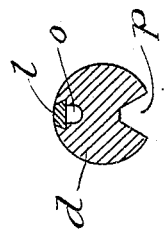

Figure 1 is a diagrammatic view of the essentials of the apparatus, showing in section parts of the drill and its mountings. Figure 2 is a cross-section of the form of the drill I prefer.

In boring long holes in non-metallic substances such as wood, particularly if the holes are to be small, there is great difficulty in properly supporting the drill to keep it in position to run true, and also in removing the material cut out by the drilling process. To obviate these difficulties I provide for mounting the drill in a non-rotative position and during the operation of boring I rotate the material to be bored, instead of the drill. The apparatus may be mounted in an ordinary lathe; the article $c$ to be bored is placed in the revolving head chuck $b$; the drill $d$ may be fixed in the tail chuck $g$, by supporting it with a head $e$, which is held in the chuck by the screw ring $f$, and packed to be air tight. This drill $d$ has an air passage $o$ for conducting a blast of air inward to the point, and also a return passage formed by planing a slot $p$ in the side of the drill. The drill being fixed in the hub $e$ and chuck $g$, its passage communicates through an inlet nipple with hose $h$, and a blast of compressed air is introduced thereby, from any suitable source.

I prefer to make the air passage $o$ in the drill by planing a small groove therein, under-cutting the sides and inserting the cover plate $l$ therein, as will be plain from Figure 2. For a return passage, through which the chips are blown out, I plane out the wide open groove $p$. It is of the greatest importance that this be an open groove, because the motion of the wood around the drill will keep the chips agitated within the groove and thereby prevent their packing and choking up the passage in the drill. Any form of cutting point desired may be used on the drill, but I prefer some blunt form which allows the introduction of the air blast directly at the point where the cutting operation is in progress. The closed inlet passage to one side of the center, together with the open groove escape passage, which it will be observed, is successively presented to all sides of the passage being bored, has the double function of promptly removing the chips and of keeping the drill and the material being bored cool on the inside of the hole. The importance of this will appear from the consideration, that where the air return passage is inside the drill, and the escaping air is not in contact with the wood, it will fail to properly cool the surface thereof. And again, by reason of the open channel, in a drill which is the same size as the hole being bored, the chips are constantly moved by the edge of the channel and prevented from blocking the passage.

It will be understood, of course, that any fluid under pressure can be used to remove the chips from the hole, but I prefer to use compressed air. It will also be understood that as the boring proceeds, the tail head $k$ and the drill will be advanced against the wood or other material, by some such means as the screw $s$, as shown. In boring a wooden article, such as a gun-cleaning rod, the article will be rotated very rapidly; and after the drill once starts it serves itself to support and guide the drill. At the beginning of the operation I generally use a rest and guide, such as the standard $n$ with a hinged jaw $m$ to engage either the drill or the wooden rod, as may be expedient.

The invention residing in the combination, broadly, of means for performing the several functions necessary to the successful boring by my improved method, I have not shown or described any specific machine, and desire it to be understood that I am not limited to any such. But, having thus described my invention, and illustrated its use in preferred form, what I claim and desire to secure by Letters Patent is the following:

1. In wood boring apparatus, the combination with a supply of compressed air and means for rotating the article to be bored, of a stationary bit of the same diameter throughout as the hole to be bored, said bit being supplied with a closed air supply passage along its side opening near the point of the drill, and an escape passage for the air and chips open along the outside of the drill, whereby the side of the hole being bored forms a movable side of the escape passage, substantially as described.

2. In boring apparatus, the combination with means for rotating the article to be bored, of a bit having a lateral or non-axial channel parallel to the axis forming an open groove and another non-axial channel peripherally closed to confine the air and direct it longitudinally of the bit near the point of the same, and means of supplying a blast of air to the last named channel at the point of the drill and carrying the chips out through the open channel along the side, substantially as described.

3. In a boring apparatus, in combination with a compressed air supply and means for rotating an article to be bored, a drill of the same size throughout its length as the hole being bored, and provided with an interior passage for the compressed air leading to the point of the drill and a return passage for the air and chips, formed by planing open slots along the side of the drill, whereby the escaping chips are agitated by contact with the revolving material being bored.

4. A drill for boring holes in wooden articles, having an interior air passage and an escape passage formed of an open groove in its side, the drill shank and head being of the same size, for the purpose specified.

5. A drill for boring revolving articles comprising a rod having two planed grooves lengthwise thereof, one of which is open and the other is covered by a dove-tailed plate set in flush with the rod and forming a closed passage-way.

In testimony whereof I have hereunto signed my name in the presence of the subscribed witnesses.

WILLIAM S. SUTTON.

Witnesses:
M. E. DEVLIN,
EDWARD P. LATHROP.